US010963328B2

United States Patent
Matić et al.

(10) Patent No.: US 10,963,328 B2
(45) Date of Patent: Mar. 30, 2021

(54) WIFI PROGRAMMER AND DEBUGGER FOR MICROCONTROLLER AND METHOD THEREOF

(71) Applicant: MikroElektronika D.O.O., Belgrade (RS)

(72) Inventors: Nebojša Matić, Belgrade (RS); Ivan Rajković, Belgrade (RS); Darko Jolić, Belgrade (RS); Nenad Marinković, Obrenovac (RS); Marko Vuković, Zemun (RS)

(73) Assignee: MikroElektronika D.O.O., Belgrade (RS)

( * ) Notice: Subject to any disclaimer, the term of this patent is extended or adjusted under 35 U.S.C. 154(b) by 147 days.

(21) Appl. No.: 16/122,876

(22) Filed: Sep. 5, 2018

(65) Prior Publication Data
US 2020/0073746 A1 Mar. 5, 2020

(51) Int. Cl.
G06F 11/07 (2006.01)
G06F 8/61 (2018.01)
G06F 11/30 (2006.01)
G06F 11/34 (2006.01)
G06F 13/42 (2006.01)

(52) U.S. Cl.
CPC ............ *G06F 11/0772* (2013.01); *G06F 8/61* (2013.01); *G06F 11/0736* (2013.01); *G06F 11/0751* (2013.01); *G06F 11/3006* (2013.01); *G06F 11/3495* (2013.01); *G06F 13/4282* (2013.01); *G06F 2213/0042* (2013.01)

(58) Field of Classification Search
CPC combination set(s) only.
See application file for complete search history.

(56) References Cited

U.S. PATENT DOCUMENTS

| 5,872,909 | A | * | 2/1999 | Wilner | G06F 11/0715 |
| | | | | | 714/38.12 |
| 5,903,371 | A | * | 5/1999 | Arecco | H04J 14/0206 |
| | | | | | 398/4 |
| 6,993,298 | B2 | * | 1/2006 | Licht | G05B 19/054 |
| | | | | | 257/273 |
| 7,089,428 | B2 | * | 8/2006 | Farley | G06F 21/552 |
| | | | | | 726/22 |

(Continued)

FOREIGN PATENT DOCUMENTS

| CN | 201117006 Y | 9/2008 |
| CN | 203535469 U | 4/2014 |

(Continued)

OTHER PUBLICATIONS

McGrew, Project Mddm, DigiPen Institute of Technology, Oct. 3, 2016.

(Continued)

*Primary Examiner* — Amine Riad
(74) *Attorney, Agent, or Firm* — The Harris Firm

(57) ABSTRACT

An arrangement is described for programming and debugging a microcontroller embedded into a system using a WiFi connection between the system and a host PC, rather than a wired connection. An optional additional monitor system collects event-driven data from the system which is compared to MCU code execution events to provide debugging information without interrupting the microcontroller.

12 Claims, 9 Drawing Sheets

(56) References Cited

U.S. PATENT DOCUMENTS

| | | | |
|---|---|---|---|
| 7,099,818 B1 * | 8/2006 | Nemecek | G06F 11/261 |
| | | | 703/28 |
| 7,412,633 B2 | 8/2008 | Kimelman et al. | |
| 7,506,313 B2 | 3/2009 | Bates et al. | |
| 7,669,064 B2 | 2/2010 | Johnson et al. | |
| 7,913,121 B2 | 3/2011 | Lou | |
| 8,423,850 B2 | 4/2013 | Iwata et al. | |
| 8,615,683 B2 * | 12/2013 | Guenther | G05B 19/41875 |
| | | | 714/38.1 |
| 8,656,361 B2 | 2/2014 | Bragdon et al. | |
| 8,726,223 B2 | 5/2014 | Garnier et al. | |
| 8,843,895 B2 * | 9/2014 | McFadden | G06F 9/45516 |
| | | | 717/100 |
| 9,009,517 B2 * | 4/2015 | Mayer | G06F 1/32 |
| | | | 713/340 |
| 9,231,858 B1 * | 1/2016 | Greifeneder | G06F 11/3636 |
| 9,292,411 B2 | 3/2016 | Chuang | |
| 2003/0217306 A1 | 11/2003 | Harthcock et al. | |
| 2006/0179374 A1 * | 8/2006 | Noble | G01R 31/3025 |
| | | | 714/727 |
| 2007/0011507 A1 | 1/2007 | Rothman et al. | |
| 2007/0226702 A1 | 9/2007 | Segger | |
| 2008/0243471 A1 * | 10/2008 | Nemecek | G06F 30/331 |
| | | | 703/28 |
| 2014/0215495 A1 | 7/2014 | Erich et al. | |
| 2016/0292057 A1 | 10/2016 | Segger | |
| 2017/0286254 A1 * | 10/2017 | Menon | G06F 11/364 |
| 2017/0315175 A1 | 11/2017 | Grossier et al. | |
| 2018/0004620 A1 | 1/2018 | Combs et al. | |

FOREIGN PATENT DOCUMENTS

| | | |
|---|---|---|
| CN | 106324484 | 1/2017 |
| CN | 206546628 U | 10/2017 |
| WO | WO 2017/035236 A1 | 3/2017 |

OTHER PUBLICATIONS

NXP Semiconductors, Kinetis K66 Sub-Family, Apr. 2017, https://www.nxp.com/docs/en/data-sheet/K66P144M180SF5V2.pdf.

Arm Ltd., System Analyzer, Sep. 5, 2018, http://www.keil.com/support/man/docs/uv4/uv4_db_dbg_systemanalyzer.htm.

Arm Ltd., ULINKplus, Sep. 5, 2018, http://www2.keil.com/mdk5/ulink/ulinkplus/.

Arm Ltd., Event Recorder, Sep. 5, 2018, http://www.keil.com/support/man/docs/uv4/uv4_db_dbg_evr.htm.

Arm Ltd., Release Notes for Microcontroller Development Kit, Sep. 5, 2018, http://www.keil.com/update/relnotes/MDK525.htm.

International Search Report (ISR) relating to International Application No. PCT/IB2019/057451, dated Mar. 30, 2020.

Written Opinion of the ISA relating to International Application No. PCT/IB2019/057451, dated Mar. 30, 2020.

* cited by examiner

WIFI PROGRAMMER AND DEBUGGER FOR MICROCONTROLLER AND METHOD THEREOF

TECHNICAL FIELD

The present disclosure relates to WiFi programmer and debugger for a microcontroller, and method, system, terminal and a computer-readable medium for the same.

BACKGROUND

It is increasingly popular to incorporate an embedded microcontroller unit (MCU) into devices and systems. Examples include household appliances (e.g. microwave oven, refrigerator, cordless phone, entertainment devices), automobiles (e.g. engine control, braking), medical devices (e.g. blood pressure, sugar measurement) and other devices to make them "smart" to add sophisticated functionality that cannot be achieved absent an embedded MCU.

The software or firmware for an MCU embedded into a "target system" can be quite complex and may be developed over time on one or more development computers (referred to herein as "host PC"). Successive versions of software or firmware are downloaded to a microcontroller, debugged, and revised until functionality goals are achieved. These present disclosure relates to the tools of the trade for programming/debugging. Typically, to download software/firmware or to debug it, a debug probe, connected to the host PC, is used to probe various nodes of a target system having an embedded MCU. The probe allows the person debugging to have full or at least partial control of the target system. Via the debug probe a developer can stop and restart the MCU of the target system, reset the MCU, read from and write to registers of the target system, read from and write to memory and peripherals of the target system, and set breakpoints for the software/firmware running on the embedded MCU.

The following references became known from one or more searches conducted in connection with a disclosure of the embodiments described herein. This patent document makes no assertion as to whether or not any particular reference constitutes "prior art" under the patent laws of the various jurisdictions for which patent protection is being sought. Copies are being provided in respective Patent Offices as part of an "Information Disclosure Statement" or equivalent in each jurisdiction.

U.S. Pat. No. 9,292,411 B2—Chuang, issued Mar. 22, 2016
U.S. Pat. No. 8,726,223 B2—Garnier et al., issued May 13, 2014
U.S. Pat. No. 8,656,361 B2—Bragdon et al., issued Feb. 18, 2014
U.S. Pat. No. 8,423,850 B2—Iwata et al., issued Apr. 6, 2013
U.S. Pat. No. 7,913,121 B2—Lou, issued Mar. 22, 2011
U.S. Pat. No. 7,669,064 B2—Johnson et al., issued Feb. 23, 2010
U.S. Pat. No. 7,506,313 B2—Bates et al., issued Mar. 17, 200
U.S. Pat. No. 7,412,633 B2—Kimelman et al., issued Aug. 12, 2008
US 2018/0004620 A1—Combs et al., published Jan. 4, 2018
US 2016/0292057 A1—Segger, published Oct. 6, 2016
US 2014/0215495 A1—Erich et al., published July 31, 2014
US 2017/0315175 A1—Grossier et al., published Nov. 2, 2017
US 2007/0226702 A1—Segger, published Sept. 27, 2007
US 2007/0011507 A1—Rothman et al., published Jan. 11, 2007
US 2006/0179374 A1—Noble, published Aug. 10, 2006
US 2003/0217306 A1—Harthcock et al., published Nov. 20, 2003
WO 2017/035236 A1—Dooley, published Mar. 3, 2017
CN 106324484
CN 203535469
CN 206546628
CN 201117006 Y
McGrew—Project MDDM, published Oct. 3, 2016
Specification Sheet Kinetis K66 Sub-Family; NXP Semiconductors The use of a wireless connection for debugging a digital circuit is known. In this regard see US 2006/0179374 A1—Noble. Noble describes conducting a boundary scan for debugging a digital circuit. He describes a boundary scan interface configured to couple to a digital circuit. Nobel's system includes a first wireless port coupled to the boundary scan interface. A second wireless port is in wireless communication with the first wireless port for allowing bidirectional communication between the first and second wireless ports. The boundary scan debugging device is coupled to the second wireless port. The boundary scan debugging device includes a processor configured to conduct a boundary scan analysis of the digital circuit across the wireless connection between the first and second wireless ports. Boundary scan techniques and instructions for testing a digital circuit are set forth in a standard called "IEEE 1149."

Near field communication has been employed for programming and debugging electronic devices. In this regard, see WO 2017/035236 A1—Dooley, published Mar. 3, 2017. A near field communications (NFC) interface communicates with a microcontroller. An interface memory is configured to store data received from the external NFC device.

McGrew—Project MDDM, published Oct. 3, 2016, describes a hand-held device that allows a user to communicate wirelessly to display an instruction sent (by wire) to a device and its response. McGrew describes that his system can be used to aid in debugging.

It would be desirable to provide a more effective method and apparatus or system.

SUMMARY

The present disclosure provides a method, and associated apparatus for programming/debugging an embedded microcontroller. A programmer debugger gathers event signals from a microcontroller embedded in a target system. These event signals indicate operation of the software/firmware being executed on the embedded microcontroller; and can be transmitted to a host PC either through a wired connection (such as USB), or wirelessly via WiFi. The event signals may be gathered in real time and without interrupting code executing on the controller. Optionally, an additional monitoring system independently gathers target system data related to operation of the target system in real time as the microcontroller executes code. This additional data is paired with the event signals gathered from the microcontroller based on timestamps assigned to both the target system data and event signals. Target system data is sent to the programmer debugger, which, in turn transmits both the event signals and target system data to the host PC via either a hard-wired connection or WiFi.

BRIEF DESCRIPTION OF THE DRAWINGS

In the accompanying drawings, which form a part of the specification and are to be read in conjunction therewith, and in which like reference numerals are used to indicate like features in the various views.

DETAILED DESCRIPTION

Figure 1:
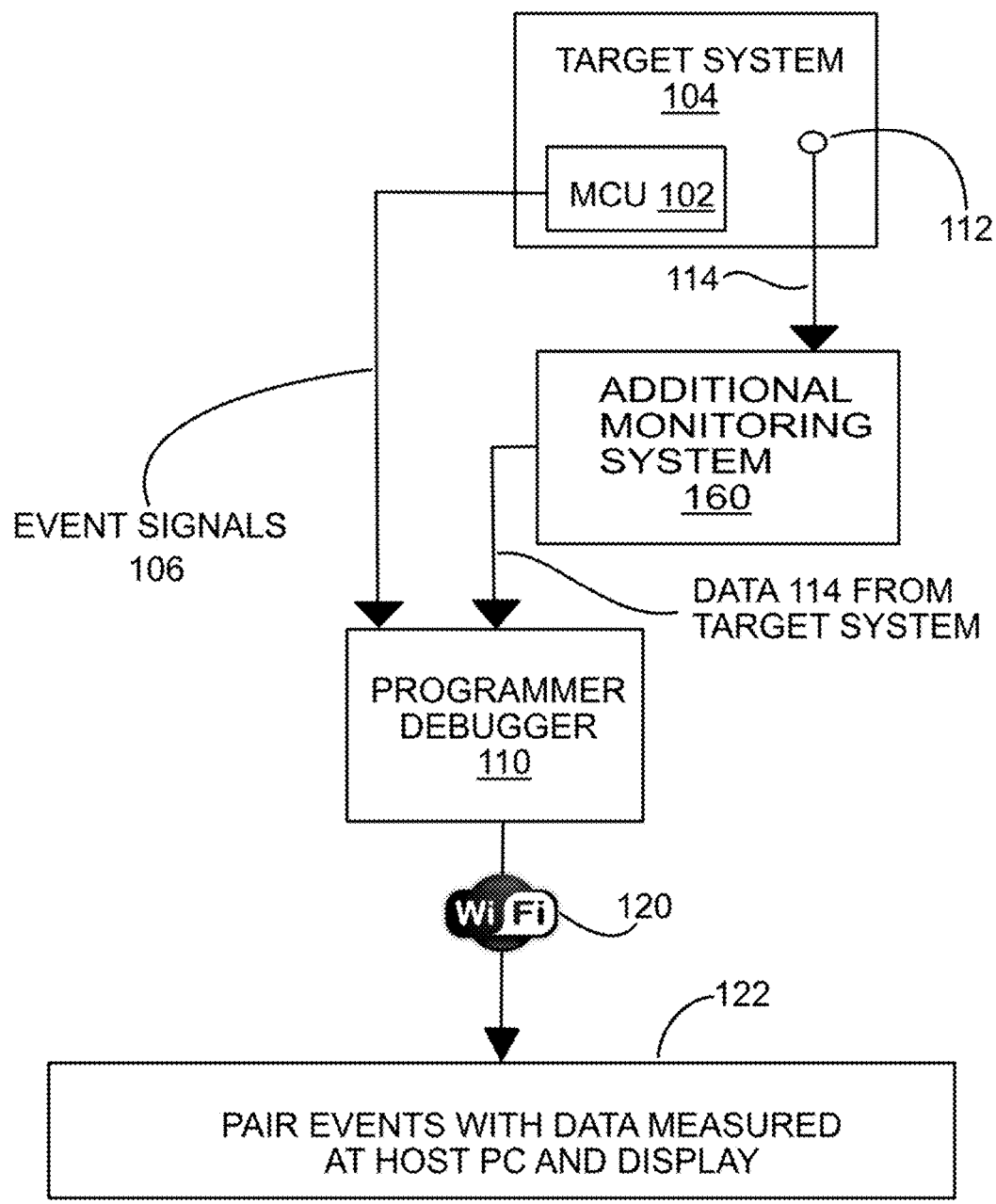
FIG. 1 is a flow chart describing an overall concept of the embodiments herein disclosed.

FIG. 1 is a schematic diagram broadly describing concepts of the disclosure. Embodiments of the present disclosure are useful in one or more of: (1) programming and (2) debugging, a microcontroller (MCU) 102 embedded in a target system 104. Once programmed (e.g., firmware stored into MCU 102), MCU 102 executes code. User defined events signals 106 from MCU 102 are captured by a programmer debugger 110. Target data 114 from target system 104 are captured, at particular nodes, such as node 112, by additional monitoring system 160 and passed along to programmer debugger 110. Target data 114 and event signals 106 cumulated by programmer debugger 110 are sent via WiFi connection 120 to a host PC. Alternatively, event signals and target data can be sent via a hard-wired connection rather than via WiFi. During debugging the code running on MCU 102, the MCU is able to execute its code without interruption. This uninterrupted execution is made possible by providing additional monitoring system 160 that, in real time, measures target data 114 (voltages and currents at specific nodes (e.g. node 112) of target system 104 simultaneously with execution of the code on MCU 102. Each event is time stamped. Each package of target data is also time stamped. User defined event signals 106, received from MCU 102 are paired 122 with the events simultaneously measured and time-stamped by additional monitoring system 160. The system is agnostic as to signal type and related events. Thus, it can be used for any type of measurement and any type of MCU and firmware, with no changes made to programmer-debugger 110. For embodiments employing WiFi 120, there is no need for wire and/or person to be on-site at the place where target system 104 is installed.

Because events are measured in real time while code is executing on MCU 102, we refer to this arrangement and method as a "hot-plug" event driven debug & monitoring arrangement. This hot plug arrangement and method can be used by a developer during research and development phase of developing a target system and by customers or maintainers of product during product during its life time.

Figure 2:
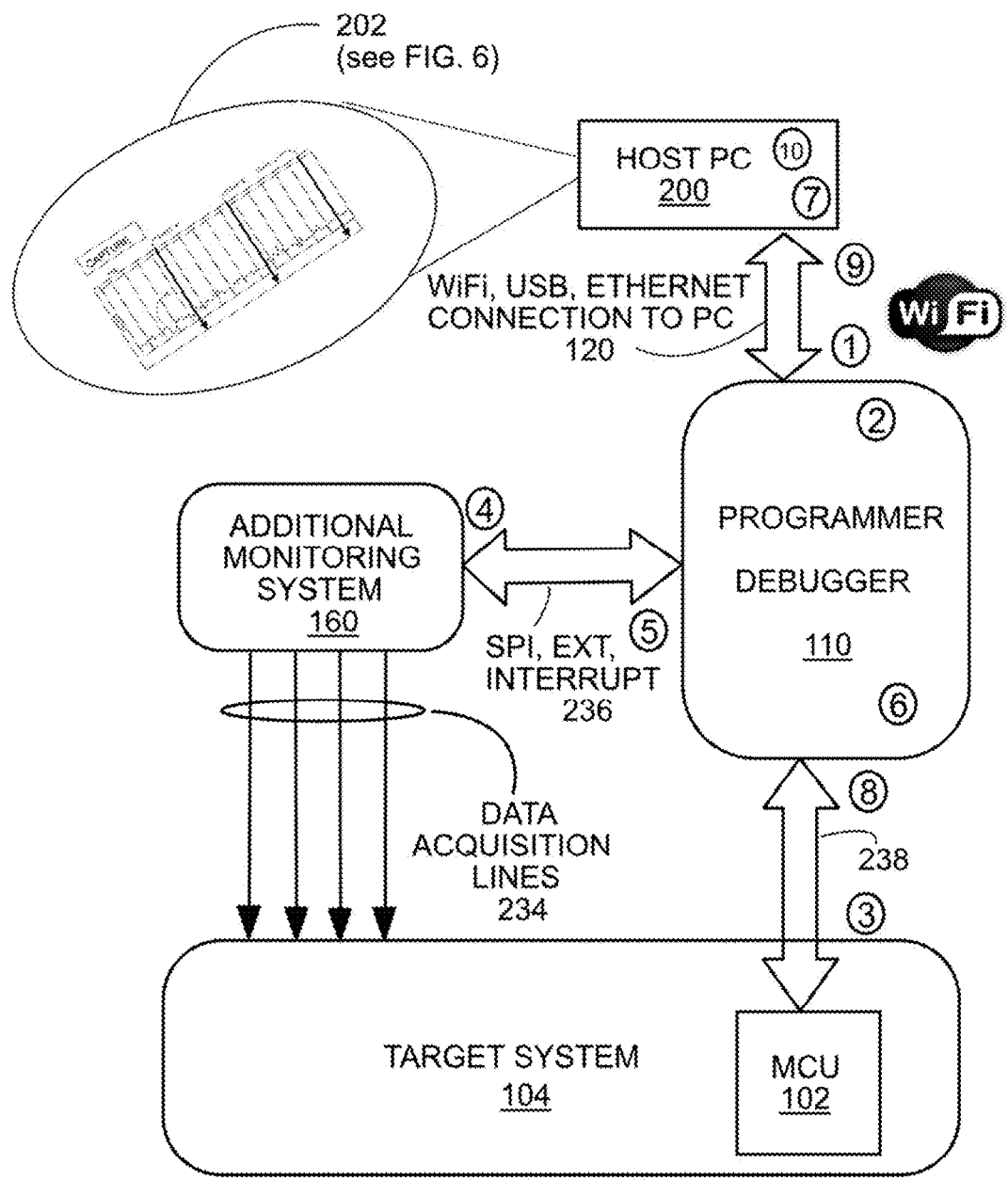
FIG. 2 is a block diagram of an embodiment showing its interaction with a target system having a MCU.

FIG. 2 is a block diagram of the embodiment showing its interaction with target system 104 having embedded MCU 102. A system with event driven debug firmware would be connected to programmer debugger 110 which in turn is connected to additional monitoring system 160. Connection to additional monitoring system 160 may be via a serial peripheral interface (SPI). A SPI is a four-wire synchronous serial communication interface used for short distance communication, and may utilize an external interrupt. Programmer debugger 110 is also connected to WiFi 120 (or alternative hard-wired connection) so that host PC 200 can initiate hot-plug event driven debug & monitoring. A user can monitor MCU 102 code execution events and system signal values during a desired period of time. This provides information as to whether system and code are behaving as expected or correction is needed. Data received can be used for further analysis and fine tuning of speed, power or any other system behavior that can be optimized or changed by future upgrade of firmware.

Host PC 200 provides software/firmware for MCU 102 embedded in target system 104. Programmer debugger 110 is coupled between host PC 200 and target system 104. It is connected to host PC 200 via WiFi or optionally via USB, and/or Ethernet.

The inclusion and use of an additional monitoring system 160 is one feature that distinguishes the present disclosure from what is known at the time of filing of this patent. Additional monitoring system 160 measures any relevant system value or signal of interest (voltages/currents at particular nodes) demonstrating operation of target system 104 in real time as code executes on Target MCU 102. Measured signals are sent to programmer debugger 110, which in turn transfers data collected by additional monitoring system 160 and events (identified by event signals) to host PC 200. At host PC 200, the events and the data from additional monitoring system 160 are combined and displayed, such as shown in insert 202. This display is shown in greater detail in FIG. 6.

Each event signal from MCU 102 is time stamped so that it can be correlated with events measured by additional monitoring system 160, which are also time stamped.

The following is a typical sequence of events explaining operation of the embodiments. In FIG. 2, these events, denoted by a number in parenthesis below, are indicated by a number within a circle in FIG. 2.

(1) A user initiates a monitoring session by sending a start capture request to the programmer-debugger device transmitted over WiFi or USB.

(2) Firmware initiates event gathering interface.

(3) WiFi programmer-debugger device will hot-plug connect to target MCU without interrupting execution of target firmware.

(4) WiFi programmer-debugger device issues capture request to additional monitoring device which in turn starts acquisition and transmitting of monitored system values (for example current, power, voltage . . . ) by predefined protocol over a SPI, or any other serial or parallel interface, to WiFi programmer-debugger.

(5) In response to the capture request and when the monitoring device is ready to start acquisition, it will signal programmer-debugger device to start event gathering loop.

(6) The programmer-debugger device starts timer for getting time stamp and starts loop.

(7) Time stamp is used for pairing events with data acquired by monitoring device.

(8) Simultaneously with data acquisition, user defined events are signalled to the WIFI programmer-debugger over SWO or UART interface (or any other serial or parallel interface) from target. When an event is received it is id is paired with time stamp and stored into events buffer.

(9) Programmer debugger 110 sends event buffer by predefined protocol over WiFi to host PC 200 on demand.

Buffer with recording of additional monitored system values acquired by monitoring device is sent to PC separately.

(10) host PC 200 then combines the contents of the two buffers to assemble and generate a graphical output indicating how system signals are changing in addition with target MCU events. These events are linked to executed code by their ID in IDE.

Figure 3:
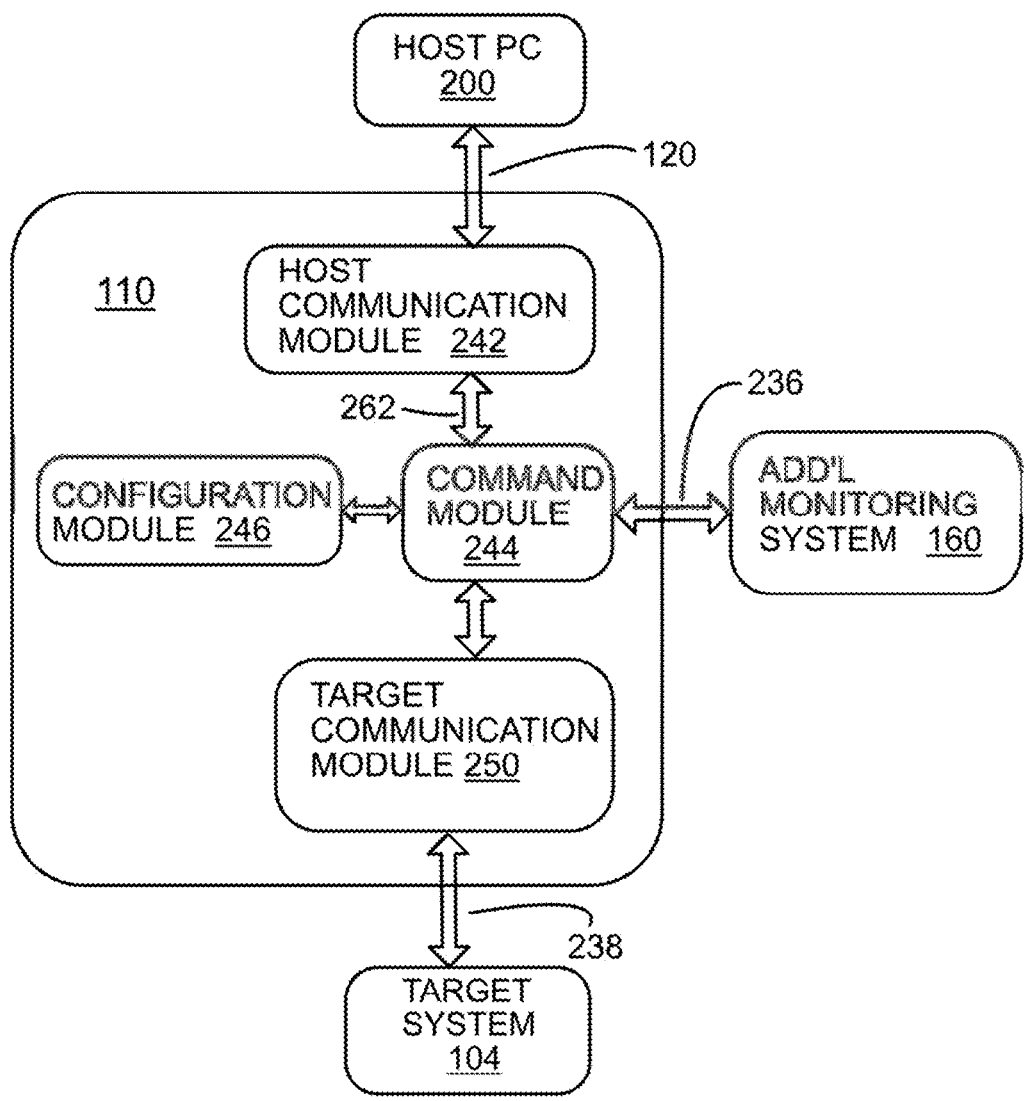
FIG. 3 is a block diagram of programmer-debugger 24, shown as a single block in FIG. 2.

FIG. 3 is a more detailed block diagram of programmer debugger 110, shown as a single block in FIG. 2. Programmer debugger 110 includes a host communication module 242 which communicates with host PC 200 via WiFi 120 and/or USB and/or an ethernet connection.

Programmer debugger 110 downloads code to MCU 102 embedded in target system 104. Host PC 200 may be a desktop computer or laptop computer. As an alternative, programmer debugger 110 can receive programming information from an SD card via a Multi Media Card (MMC) interface, such as, for example, from a memory-card used for solid-state storage. A MMC interface is low pin-count serial interface used for communication with a MMC. If host PC 200 is a computer, programmer debugger 110 may communicate programming and debugging commands and information via a USB or WiFi interface. Programmer debugger 110 is capable of communicating with various kinds of embedded system. Communication can be carried out via JTAG (Joint Test Action Group, which is an industry standard for verifying designs and testing printed circuit boards after manufacture. Depending on the version of JTAG, two, four, or five pins are added), SPI, or serial wire debug (SWD), which is an alternative 2-pin electrical interface that uses the same protocol as JTAG. It can also communicate with additional monitoring system 160 via a SPI primarily in embedded systems, UART, I2C, etc. Host PC 200 is capable of selecting the interface to be used in communication between the host system and the programming module as well as between the programming module and the target embedded system. Depending on the interface, various communication parameters can be configured by the host.

Host communication module 242 receives commands and information from host PC 200 for programming (installing firmware or revised firmware) or debugging. Host command module 242 operates in real time regardless of the interface used to communicate with host PC 200. When the programmer-debugger 110 starts up host communication module 242 will begin receiving and transmitting commands and data via its interfaces with host PC 200 and command module 244. Firmware is installed/updated as needed. Than processes are started for processing communication and data. Host communication module 242 receives information from host PC 200 by detecting HID/UDP/TCP interrupts depending upon the selected interface.

Command module 244 controls the parsing of information received and instructs the appropriate module. It dispatches commands from host communication module 242 to target communication module 250, configuration module 246 and additional monitoring system 160 (via SPI, UART, I2C, external interrupt).

Configuration module 246 processes commands/data related to the programmer-debugger itself. These include: reset, setting or reading module configuration, reading module information like serial number, firmware version, etc., or processing various signals to the module.

Commands and information intended to reach the target system 104 are directed through the target communication module 250. It initializes the desired target interface (SWD, JTAG, SPI) configuring various interface parameters, establishing connection with the target, sending commands/data to target and receiving target response by processing appropriate interrupts.

For communication between host PC 200 and target system 104, all communications are initiated by host PC 200. Host PC 200 can write to and read from the target device by sending an appropriate command/data package. After the host communication module 242 receives these commands, it passes them to target communication module 250 which then passes the commands/data package to the target system 104 via an appropriate interface 238 which will then processes it and, depending on the command, sends response data to target communication module 250, which then returns it to host communication module 242.

In the case of communication with an additional monitoring system 160, host PC 200 can send commands/data via host communication module 242 and command module 244 and receive data from additional monitoring system 160 via the same path. Additional monitoring system 160 can be configured to periodically send data to host PC 200 with no command from the host being previously received.

Figure 4:
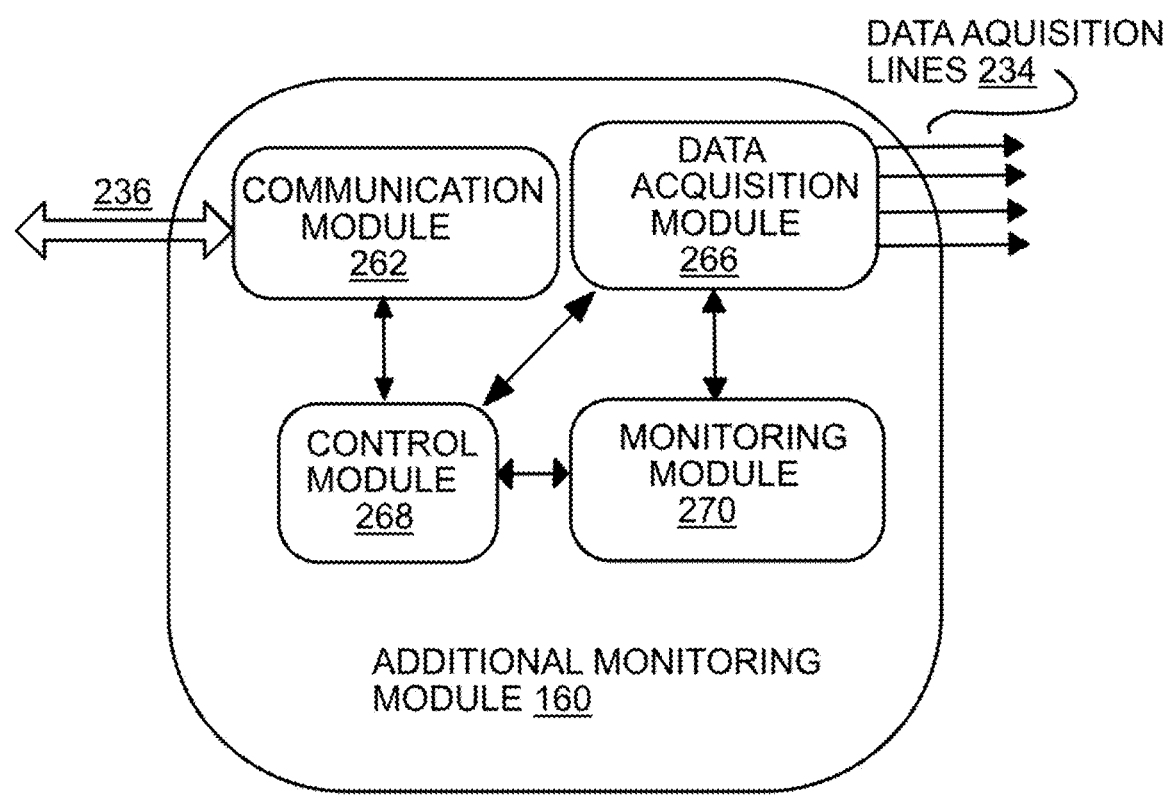
FIG. 4 is a block diagram of an additional monitoring system 160, shown as a single block in FIG. 2.

FIG. 4 is a more detailed diagram of additional monitoring system 160. Additional monitoring system 160 includes a communication module 262, a control module 268, a data acquisition module 266, and a monitoring module 270.

Communication module 262 controls communication with programmer debugger 110 via connection 236. A preferred implementation includes SPI communication with interrupt lines for additional signaling. However, other serial communication arrangements can be used.

Control module 268 interprets commands from communication module 262 and controls other parts of the system. It formats data acquired from the data acquisition module 266 to send it on demand through communication module 262. Data acquisition module 266 acquires raw data readings that will be processed by an application running on host PC 200.

Embodiments of the present disclosure were fabricated and tested. One preferred embodiment includes a programmer debugger (no additional monitoring system) that communicates with host PC 200 via WiFi. Other embodiments include an additional monitoring system that obtains target data in real time and date/time stamps that data. The target data are transferred to the programmer debugger which, in turn, sends both event signals from the microcontroller embedded in the target system and target data collected by the additional monitoring system to host PC 200 either by hard-wired connection or via WiFi.

In embodiments, WiFi communication is provided by a Texas Instrument CC3100 WiFi Network Processor. The CC3100 processor is a WiFi certified chip that is part of the SimpleLink WiFi family. The CC3100 device integrates all protocols for WiFi and Internet. It includes built-in security protocols. The WiFi network processor subsystem features a WiFi Internet-on-a-Chip and contains an additional dedicated ARM MCU that completely offloads the host MCU. This subsystem includes an 802.11 b/g/n radio, baseband, and MAC with a powerful crypto engine for fast, secure Internet connections with 256-bit encryption. The CC3100 device supports Station, Access Point, and WiFi Direct modes. The device also supports WPA2 personal and enterprise security and WPS 2.0. This subsystem includes embedded TCP/IP and TLS/SSL stacks, HTTP server, and multiple Internet protocols.

In embodiments, programmer debugger 110 is implemented by a MK66FX1M0VLQ18 integrated circuit manufactured by NXP Semiconductors. This integrated circuit is described in detail in the "Kinetis K66 Sub-Family" Data Sheet published by NXP Semiconductors; Rev. 4, 04/2017, which is incorporated herein by reference as if fully set forth.

A display controller for displaying debugging information during and after debugging operations was implemented by a SSD1963 integrated circuit, manufactured by TechToys (www.TechToys.com). The particular display controller should be selected based on the kind of display being driven.

Embodiments are capable of programming (firmware to target device), and performing standard debugging over USB connection or WiFi. Embodiments including the additional monitoring system make "hot-plug" event monitoring possible.

Figure 5:
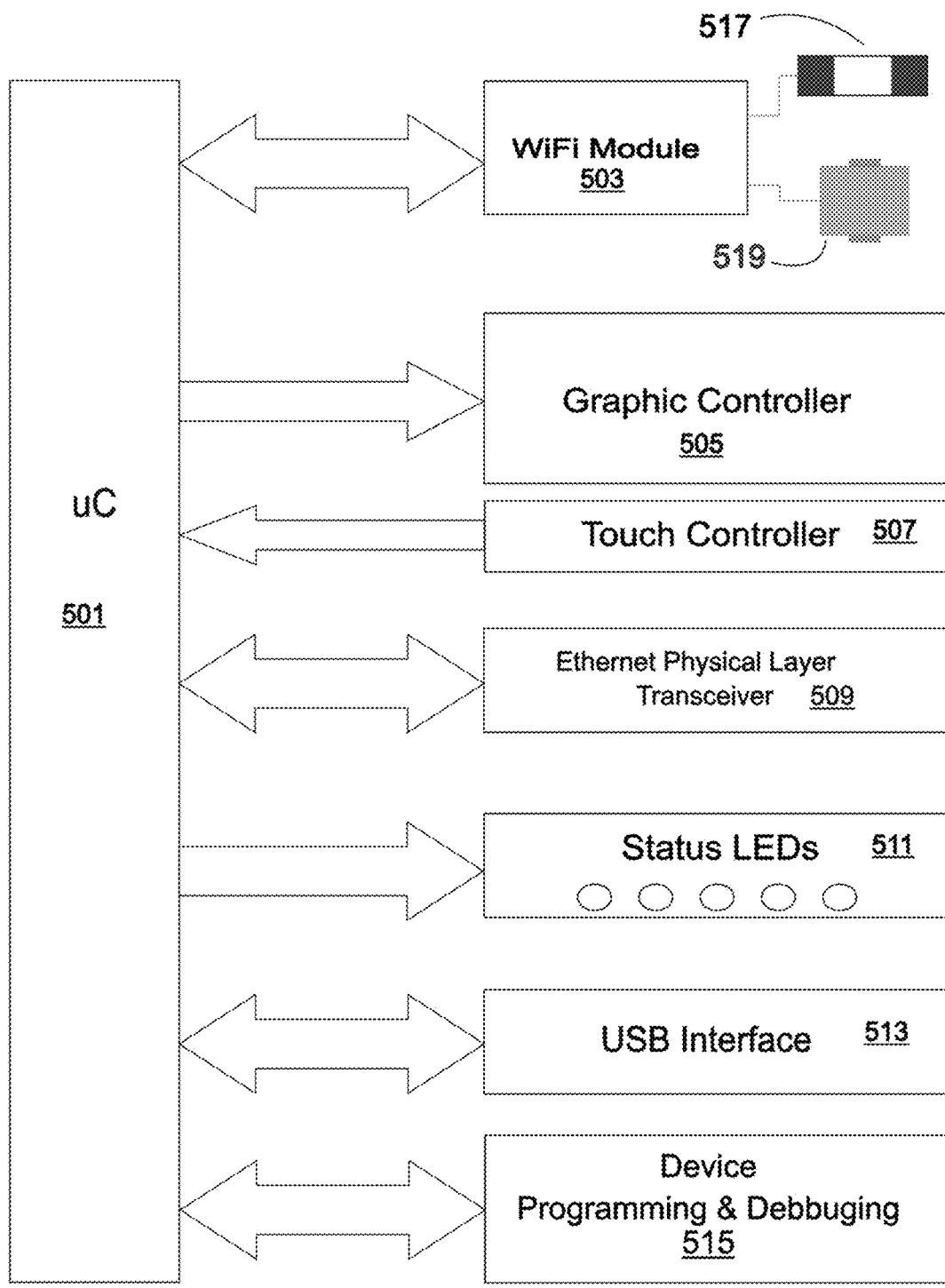
FIG. 5 is a simplified schematic diagram of the embodiment indicating its logical blocks.

FIG. 5 is a schematic diagram showing the logic blocks of WiFi Programmer Debugger 110, implemented using a microcontroller (uC) 501. The various parts of hardware schematic are abstracted as logical blocks. Arrows show direction of communication between microcontroller 501 and appropriate parts of the system. Microcontroller 501 connects to and controls all other elements of the Programmer/Debugger Module. In the upper portion of FIG. 5, shows an internal antenna 517 for the WiFi module, and a connector 519 for an external antenna. A WiFi module 503 establishes WiFi connections and sends and receives messages through WiFi. A graphic controller 505 is provided to drive a display (not shown in FIG. 5), receives display instructions from microcontroller 501 and translates them in appropriate signals for drawing image on display. A touch controller 507 processes sensed user touch input on display, such as touch commands, and sends it to microcontroller 501. An ethernet physical layer transceiver 509 establishes and maintains ethernet communication. Status LEDs 511 provide indications to a user. A USB interface 513 establishes and maintains USB communication. Device programming and debugging 515 is in charge of communication with the targets with various communication protocols, e.g. SPI, SWD, JTAG, and UART.

Figure 6:
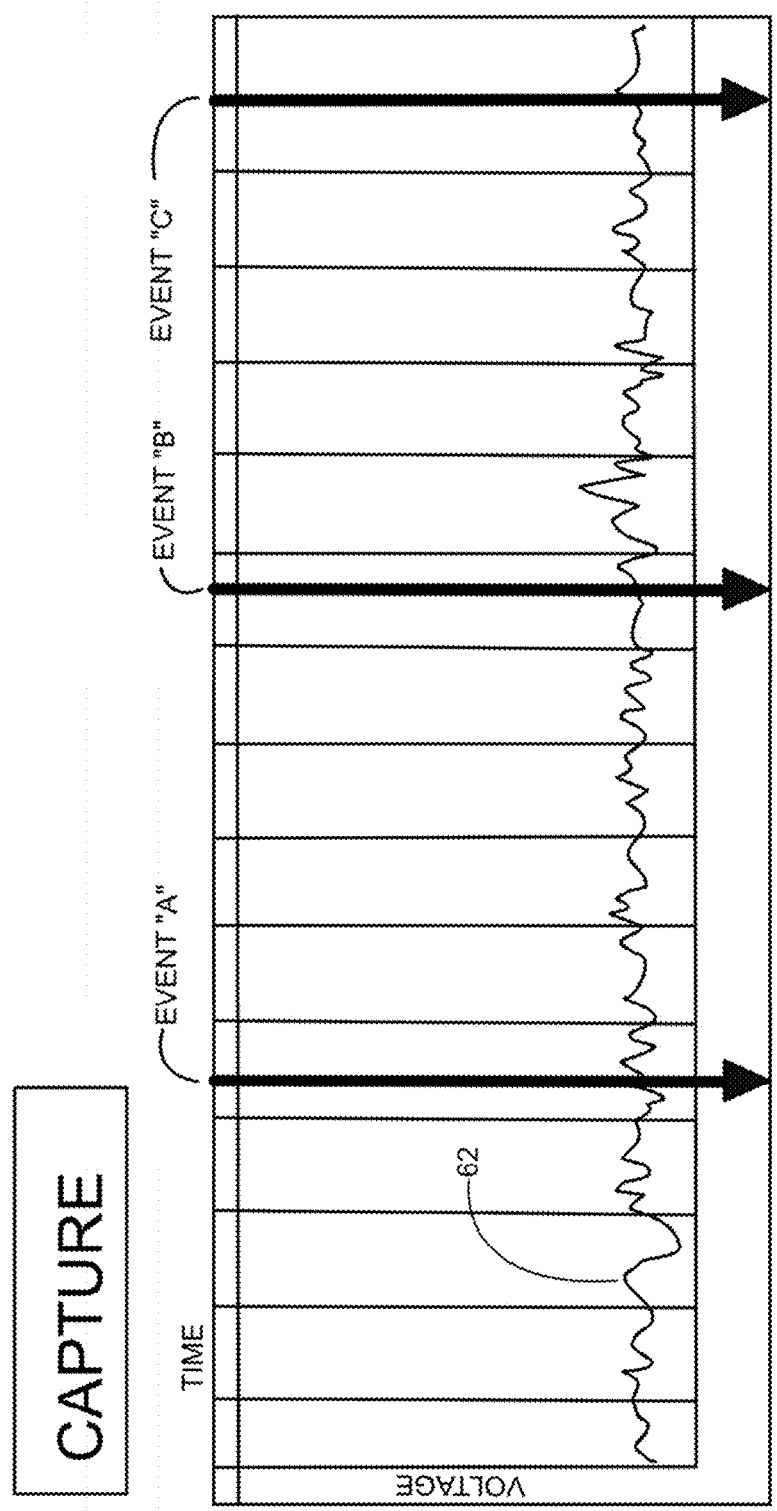
FIG. 6 is a graphical representation, generated at the host PC, of a voltage waveform 62 measured by the additional monitoring system 160 at a particular node of a target system.

FIG. 6 is an image of a waveform 62 generated at host PC 20 by based on data received from the programmer debugger, which includes data gathered by additional monitoring system 160. Three events ("A," "B," and "C") are shown occurring along a time line, indicated by black arrows pointing down. These events are correlated with a signal 62 measured in real time by additional monitoring system 160. A person performing the debugging is able to utilize this information in various ways. For example, use of embodiments makes it possible to cause a particular event to occur in the microcontroller and see exactly what the effect is on the target system by looking at a particular waveform associated with a portion of the target system that reacts the induced event.

For example, consider a user that has a system with microcontroller and WiFi module which are powered from same source, where microcontroller controls power on/off state of wifi module. If user adds a function to the code which would send an event on WiFi module power state change, control module 244 would add timestamp to event and send it to HOST PC 200 through host communication module 242. Event "C" on FIG. 6 might indicate a change in power consumption at the moment when WiFi module is powered on.

Figure 7:
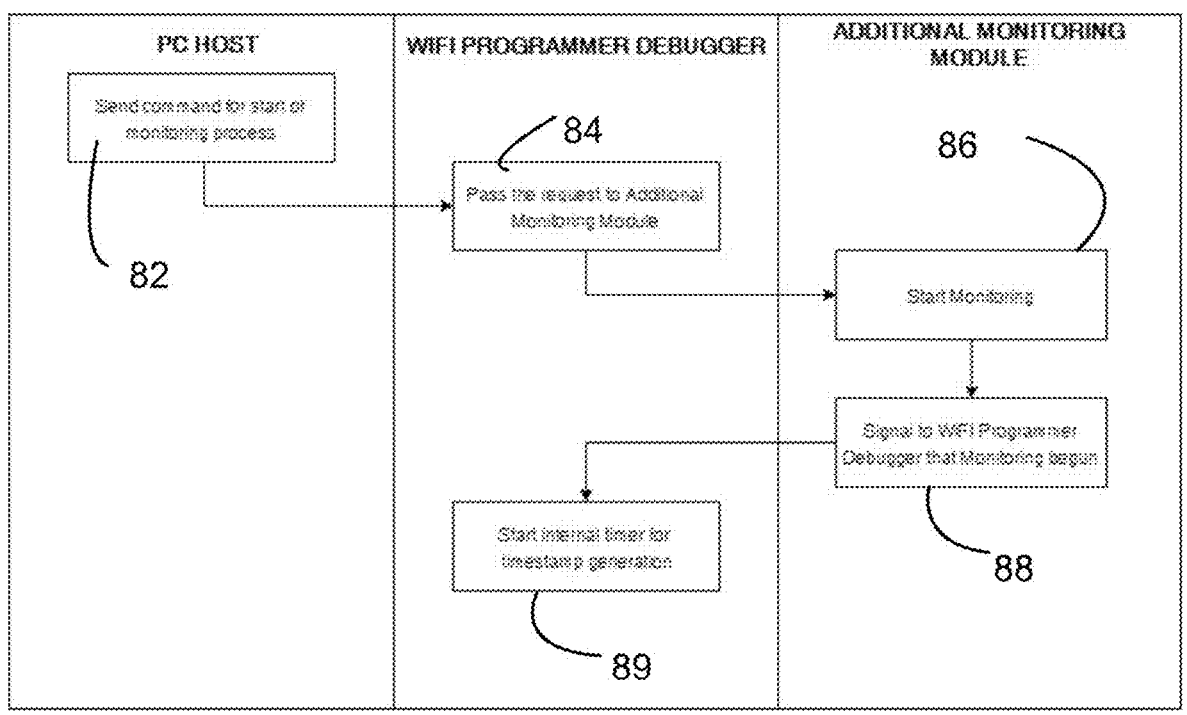
FIGS. 7, 8, and 9 are flow charts describing how programmer debugger 110 and additional monitoring system 160 gather data that is coordinated by host PC 20.
Figure 8:
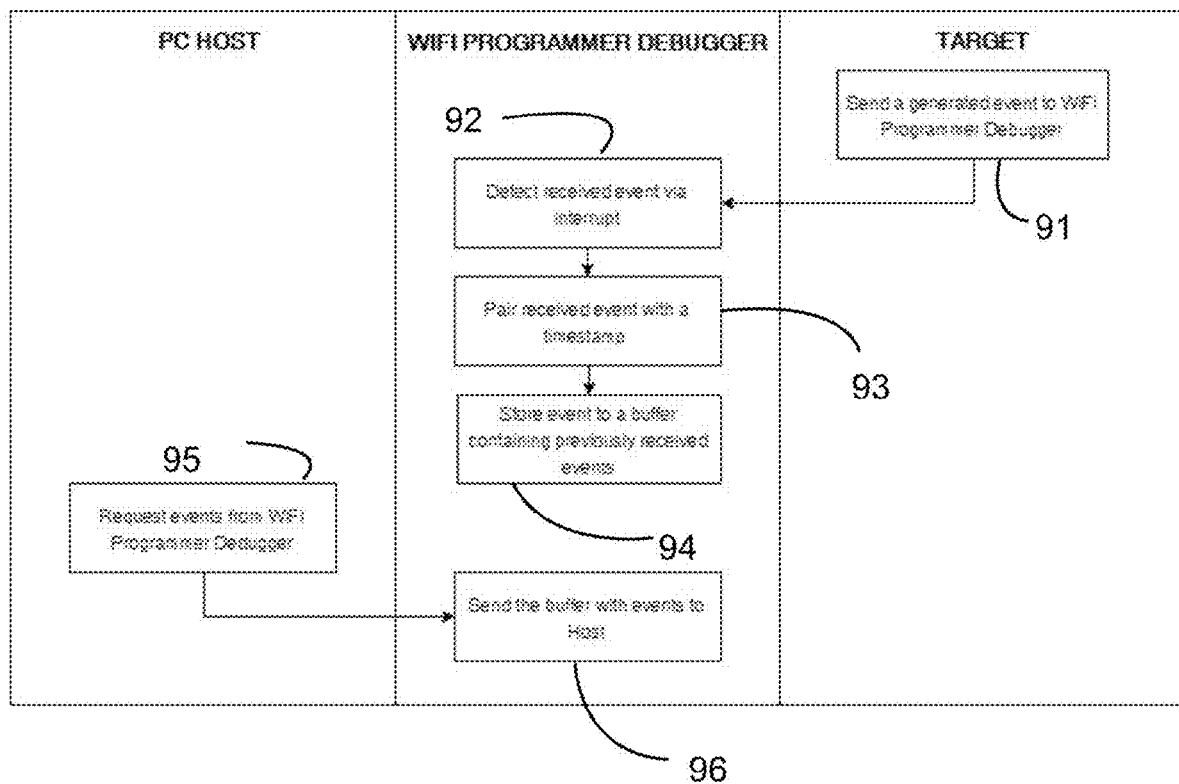
Figure 9:
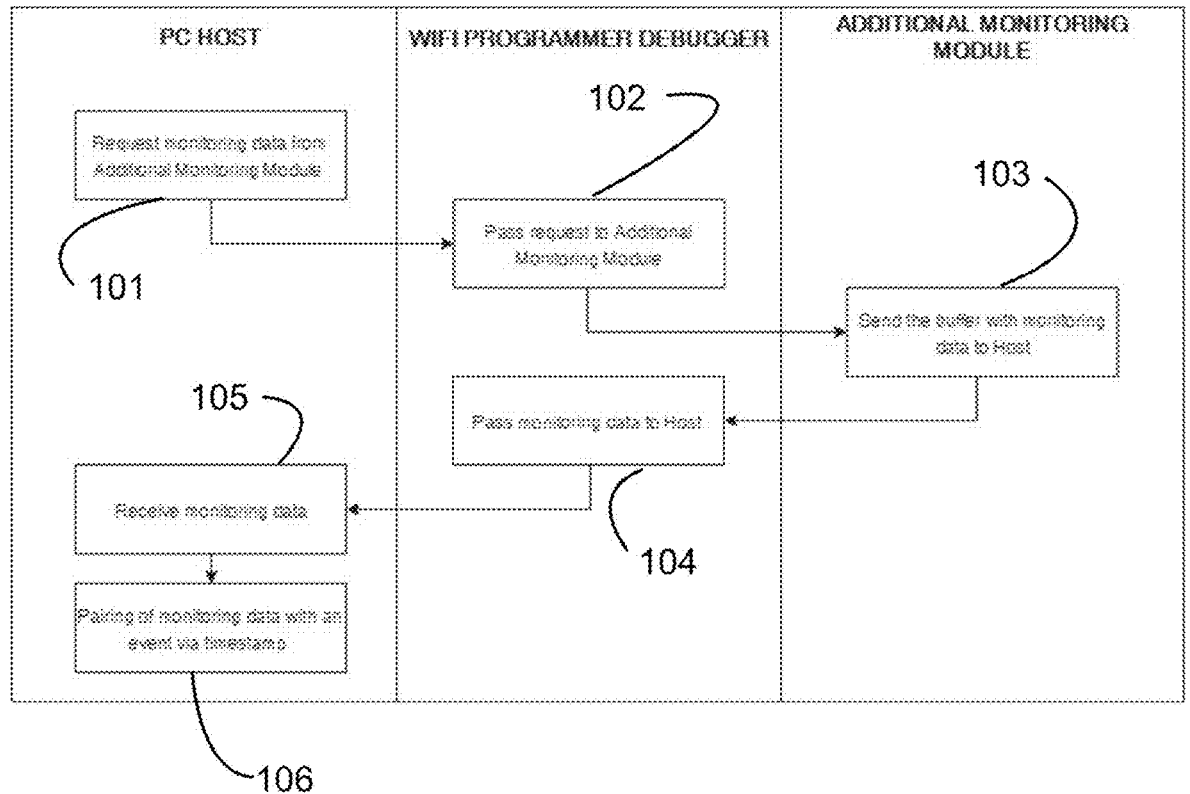

FIGS. 7, 8, and 9 are flow charts describing how programmer debugger 110 and additional monitoring system 160 gather data that is coordinated by host PC 200.

Referring to FIG. 7, host PC 200 initiates and sends (82) to programmer debugger 110 a command to start a monitoring process. Programmer debugger 110 receives this command and passes (84) a request to additional monitoring system 160. additional monitoring system 160 receives that request and starts monitoring at 86. Additional monitoring system 160 signals (88) to programmer debugger 110 when monitoring has begun. Upon receipt of this monitoring indication, programmer debugger 110 starts (89) an internal timer for generating time stamps to be associated with various monitoring data.

FIG. 8 illustrates a process whereby host PC 200 obtains "events" from target system 104 that will later be pairs with data from additional monitoring system 160. When target system 104 generates an event, it sends (91) that event to Programmer Debugger 110. The event is detected at 92 via an interrupt. That event is assigned (93) a timestamp so that the event can later be paired with data from additional monitoring system 160. The event is stored (94) to a buffer designated to receive event data. Later, when there is a request (95) from host PC 20 to Programmer Debugger 110 to retrieve cumulated events, the contents of the event buffer are sent to host PC 200 at 96.

FIG. 9 explains the process of obtaining data from additional monitoring system 160. Host PC 200 requests monitoring data from additional monitoring system 160 at 101. That request is sent to programmer debugger 110, which, in turn, passes a request to additional monitoring system 160 at 102. Data that has been collected and stored in a buffer is, in response, sent to programmer debugger 110 at 103. In turn, programmer debugger 110 passes that data to host PC 200 at 104. Host PC 200 receives that monitoring data at 105 and pairs it with events at 106 by matching timestamps previously assigned to events.

The following numbered clauses set forth various embodiments of the disclosure:

1. At least one
   (a) computer-implemented method of (i) programming, (ii) debugging, or (iii) programming and debugging, an embedded microcontroller,
   (b) terminal, by way of
       (i) means for or
       (ii) software module(s) for performing operation(s), or
       (iii) comprising at least one processor; and at least one memory storing instruction(s) that, when executed by the at least one processor, cause the at least one processor to cause,
   (c) system, by way of
       (i) means for, or
       (ii) software module(s) for performing operation(s), or
       (iii) comprising at least one processor; and at least one memory storing instructions that, when executed by the at least one processor, cause the at least one processor to cause, or
   (d) transitory or non-transitory computer-readable medium (or alternately also herein throughout, computer storage apparatus) containing instructions which when executed by one or more computers each or collectively comprising one or more processors cause operation(s), according to any one of the above or below clauses, the operation(s) comprising:
       gathering microcontroller event signals and operational data related to a microcontroller embedded in a target system in real time without interrupting code executing on the controller;

1.5. A method, terminal, system or, transitory or non-transitory computer-readable medium according to any one of the above or below clauses, further comprising communicating the event signals and operational data to a host PC via a hard-wired connection or via WiFi.

2. A method, terminal, system or, transitory or non-transitory computer-readable medium according to any one of the above or below clauses, further comprising further comprising installing or revising firmware in the microcontroller.

3. A method, terminal, system or, transitory or non-transitory computer-readable medium according to any one of the above or below clauses, further comprising further comprising collecting event-driven operational data from a target system in which a microcontroller is embedded 4. A method, terminal, system or, transitory or non-transitory computer-readable medium according to any one of the above or below clauses, wherein communication to the host PC occurs via a USB connection.

5. A method, terminal, system or, transitory or non-transitory computer-readable medium according to any one of the above or below clauses, further comprising:
gathering microcontroller event signals related to a microcontroller embedded in a target system in real time without interrupting code executing on the controller;
independently gathering target system data related to operation of the target system in real time as the microcontroller executes code;
pairing microcontroller event signals with target system data using timestamps assigned to the events and timestamps assigned to the target system data.

6. A method, terminal, system or, transitory or non-transitory computer-readable medium according to any one of the above or below clauses, wherein the event signals are transmitted to a host via WiFi.

7. A method, terminal, system or, transitory or non-transitory computer-readable medium according to any one of the above or below clauses, wherein the target system data are acquired by a module separate and distinct from the gathering of event signals related to the microcontroller.

8. A method, terminal, system or, transitory or non-transitory computer-readable medium according to any one of the above or below clauses, wherein the independently gathering target system data comprises:
sending, by a host PC, a command to start a monitoring process.

8.1 A method, terminal, system or, transitory or non-transitory computer-readable medium according to any one of the above or below clauses, further comprising passing by a primary programmer debugger to an additional monitoring system a request to start monitoring.

8.2 A method, terminal, system or, transitory or non-transitory computer-readable medium according to any one of the above or below clauses, further comprising monitoring by the additional monitoring system.

8.3 A method, terminal, system or, transitory or non-transitory computer-readable medium according to any one of the above or below clauses, further comprising signaling, by the additional monitoring system, to the primary programmer debugger that monitoring has begun.

8.4 A method, terminal, system or, transitory or non-transitory computer-readable medium according to any one of the above or below clauses, further comprising starting, by the primary programmer debugger, a timer for generating timestamps to be assigned to data gathered by the additional monitoring system.

9. A method, terminal, system or, transitory or non-transitory computer-readable medium according to any one of the above or below clauses, further comprising wherein gathering microcontroller event signals comprises: sending generated event signals from the target microcontroller to the primary programmer debugger.

9.1 A method, terminal, system or, transitory or non-transitory computer-readable medium according to any one of the above or below clauses, further comprising receiving the event signals at the primary programmer debugger via an interrupt.

9.2 A method, terminal, system or, transitory or non-transitory computer-readable medium according to any one of the above or below clauses, further comprising pairing received event signals with a timestamp.

9.3 A method, terminal, system or, transitory or non-transitory computer-readable medium according to any one of the above or below clauses, further comprising storing event signals with timestamps to an event signal buffer.

9.4 A method, terminal, system or, transitory or non-transitory computer-readable medium according to any one of the above or below clauses, further comprising requesting, by a host PC, that that the primary programmer debugger send contents of the event signal buffer to the host PC.

10. A method, terminal, system or, transitory or non-transitory computer-readable medium according to any one of the above or below clauses, further comprising:
initiating a monitoring session by sending a capture request to a programmer-debugger.

10.1 A method, terminal, system or, transitory or non-transitory computer-readable medium according to any one of the above or below clauses, further comprising in response, initiating an event gathering interface.

10.2 A method, terminal, system or, transitory or non-transitory computer-readable medium according to any one of the above or below clauses, further comprising connecting the programmer-debugger device to a target MCU without interrupting execution of target firmware.

10.3 A method, terminal, system or, transitory or non-transitory computer-readable medium according to any one of the above or below clauses, further comprising issuing by the programmer-debugger a capture request to an additional monitoring device.

10.4 A method, terminal, system or, transitory or non-transitory computer-readable medium according to any one of the above or below clauses, further comprising acquiring by the additional monitoring device data indicative of the operation of the microcontroller.

10.5 A method, terminal, system or, transitory or non-transitory computer-readable medium according to any one of the above or below clauses, further comprising in response to the capture request, signaling the programmer-debugger device to start capturing events.

10.6 A method, terminal, system or, transitory or non-transitory computer-readable medium according to any one of the above or below clauses, further comprising starting a timer for generating timestamps.

10.7 A method, terminal, system or, transitory or non-transitory computer-readable medium according to any one of the above or below clauses, further comprising using timestamps to pair events with data acquired by the additional monitoring device.

10.8 A method, terminal, system or, transitory or non-transitory computer-readable medium according to any one of the above or below clauses, further comprising simultaneously with data acquisition, signaling defined events to the WWI Programmer-debugger.

10.9 A method, terminal, system or, transitory or non-transitory computer-readable medium according to any one of the above or below clauses, further comprising when an event is received, pairing it based on its ID with time stamp and storing it into an events buffer.

10.10 A method, terminal, system or, transitory or non-transitory computer-readable medium according to any one of the above or below clauses, further comprising sending contents of the event buffer by the programmer-debugger to the host PC.

10.11 A method, terminal, system or, transitory or non-transitory computer-readable medium according to any one of the above or below clauses, further comprising recording additional monitored system values acquired by monitoring device and sending them separately to the PC.

10.12 A method, terminal, system or, transitory or non-transitory computer-readable medium according to any one of the above or below clauses, further comprising combining, at the host PC, the contents of the two buffers to assemble and generate a graphical output indicating how system signals are changing in addition with target MCU events.

10.13 A method, terminal, system or, transitory or non-transitory computer-readable medium according to any one of the above or below clauses, further comprising linking the events to executed code based on their associated IDs.

11. A method, terminal, system or, transitory or non-transitory computer-readable medium according to any one of the above or below clauses, wherein communication between the programmer and debugger and host PC occurs via WiFi.

12. A method, terminal, system or, transitory or non-transitory computer-readable medium according to any one of the above or below clauses, further comprising a programmer and debugger module.

12.1 A method, terminal, system or, transitory or non-transitory computer-readable medium according to any one of the above or below clauses, further comprising a WiFi module for communicating the programmer and debugger module with a host PC.

12.2 A method, terminal, system or, transitory or non-transitory computer-readable medium according to any one of the above or below clauses, further comprising an additional monitoring system arranged to measure events of a target system having an embedded microcontroller unit (MCU)and record those events with a time stamp so that they can be correlated with event signals from the target MCU received via WiFi at the host PC.

Embodiments can work with software, hardware, and/or operating system implementations other than those described herein. Any software, hardware, and operating system implementations suitable for performing the functions described herein can be used. Embodiments are applicable to both a client and to a server or a combination of both.

While it is apparent that the illustrative embodiments of the disclosure herein fulfil one or more objectives or inventive solutions, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments that would come within the spirit and scope of the present disclosure.

The above embodiments are to be understood as illustrative examples of the disclosure. Further embodiments of the disclosure are envisaged. It is to be understood that any feature described in relation to any one or one set of embodiments may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

We claim:

1. A method of (a) programming, (b) debugging, or (c) programming and debugging, an embedded microcontroller, comprising:
    gathering the microcontroller's user defined event signals and operational data related to the microcontroller, which is embedded in a target system in real time without interrupting code executing on the microcontroller;
    wherein the operational data are gathered by an additional monitoring system;
    at a programmer debugger device that is distinct from the target system:
        gathering the user defined event signals directly from the target system;
        time stamping the user defined event signals; and
        time stamping the operational data; and
    communicating the user defined event signals and operational data to a host PC via a hard-wired connection or via WiFi.

2. A method according to claim 1 further comprising installing or revising firmware in the microcontroller.

3. A method according to claim 1 further comprising collecting event-driven operational data from a target system in which a microcontroller is embedded.

4. A method according to claim 1 wherein communication to the host PC occurs via a USB connection.

5. A method of (a) programming, (b) debugging, or (c) programming and debugging, an embedded microcontroller, comprising:
    gathering microcontroller user defined event signals related to the microcontroller, which is embedded in a target system in real time without interrupting code executing on the microcontroller;
    independently gathering target system data related to operation of the target system in real time as the microcontroller executes code;
    wherein the target system data are gathered by an additional monitoring system;
    at a programmer debugger device that is distinct from the target system:
        (a) gathering the user defined event signals directly from the target system;
        (b) time stamping the user defined event signals;
        (c) time stamping the target system data; and
        (d) pairing the microcontroller user defined event signals with the target system data using the timestamps assigned to the user defined event signals and the timestamps assigned to the target system data.

6. A method according to claim 5 wherein the event signals are transmitted to a host via WiFi.

7. A method according to claim 5 wherein the target system data are acquired by a module separate and distinct from the gathering of event signals related to the microcontroller.

8. A method according to claim 5 wherein the independently gathering target system data comprises:
    sending, by a host PC, a command to start a monitoring process;

passing by a primary programmer debugger to an additional monitoring system a request to start monitoring;
monitoring by the additional monitoring system;
signaling, by the additional monitoring system, to the primary programmer debugger that monitoring has begun; and
starting, by the primary programmer debugger, a timer for generating timestamps to be assigned to data gathered by the additional monitoring system.

9. A method according to claim 5 wherein gathering microcontroller event signals comprises:
sending generated event signals from the target microcontroller to the primary programmer debugger;
receiving the event signals at the primary programmer debugger via an interrupt;
pairing received event signals with a timestamp;
storing event signals with timestamps to an event signal buffer;
requesting, by a host PC, that that the primary programmer debugger send contents of the event signal buffer to the host PC.

10. A method of (a) programming, (b) debugging, or (c) programming and debugging, an embedded microcontroller, comprising:
initiating a monitoring session by sending a capture request to a programmer-debugger device;
in response, initiating an event gathering interface;
connecting the programmer-debugger device to a target MCU without interrupting execution of target firmware;
issuing, by the programmer-debugger device, a capture request to an additional monitoring device;
acquiring by the additional monitoring device data indicative of the operation of the microcontroller;
in response to the capture request, signaling the programmer-debugger device to start capturing user defined events;
at the programmer-debugger device that is distinct from the target MCU:
(a) starting a timer for generating timestamps; and
(b) using timestamps to pair events with data acquired by the additional monitoring device;
simultaneously with data acquisition, signaling user defined events to the programmer-debugger device;
when one of the user defined events is received, pairing it based on its ID with a time stamp and storing it into an events buffer;
sending contents of the event buffer by the programmer-debugger device to the host PC;
recording the data indicative of the operation of the microcontroller acquired by monitoring device and sending them separately to the PC via WiFi;
combining, at the host PC, the contents of the two buffers to assemble and generate a graphical output indicating how system signals are changing in addition with the user defined events; and
linking the user defined events to executed code based on their associated IDs.

11. A method according to claim 10 wherein communication between the programmer and debugger and host PC occurs via WiFi.

12. A programming and debugging arrangement, comprising:
a programmer and debugger module distinct from a target system;
a WiFi module for communicating the programmer and debugger module with a host PC; and
an additional monitoring system arranged to measure operational events of the target system having an embedded microcontroller unit (MCU) and record, at the programmer and debugger module, those operational events with a time stamp so that they can be correlated with user defined event signals from the target MCU received via WiFi at the host PC.

* * * * *